March 26, 1968

W. J. LEIDIGH ET AL 3,375,397

EXTENDED INTERACTION KLYSTRON HAVING INDUCTIVE
COUPLING MEANS COMMUNICATING BETWEEN
ADJACENT CAVITY RESONATORS

Filed April 30, 1964

INVENTORS
WILLIAM JARED LEIDIGH
DONALD H. PREIST

BY Harry M Weiss
Robert W Ditts

ATTORNEYS

INVENTORS
WILLIAM JARED LEIDIGH
DONALD H. PREIST
BY Harry M Weiss
Robert W Dilts
ATTORNEYS INVENTORS
WILLIAM JARED LEIDIGH
DONALD H. PREIST
BY Harry M Weiss
Robert W Dilts
ATTORNEYS though the traveling-wave tube, there is no instability problem which often necessitates the use of attenuators inside the vacuum to absorb power reflected from a mismatched load or to

United States Patent Office 3,375,397
Patented Mar. 26, 1968

3,375,397
EXTENDED INTERACTION KLYSTRON HAVING INDUCTIVE COUPLING MEANS COMMUNICATING BETWEEN ADJACENT CAVITY RESONATORS
William Jared Leidigh, Belmont, and Donald H. Preist, Mill Valley, Calif., assignors, by mesne assignments, to Varian Associates, a corporation of Delaware
Filed Apr. 30, 1964, Ser. No. 363,900
10 Claims. (Cl. 315—5.46)

ABSTRACT OF THE DISCLOSURE

A high power microwave linear beam amplifier tube is disclosed. The tube includes an input circuit coupled to the electron beam and excited with a microwave signal to be amplified. The microwave signal velocity modulates the beam and the modulated beam passes into an extended interaction output circuit which is excited by the bunched beam to produce an amplified output signal. A depressed collector structure collects and dissipates the energy of the beam after passage through the output circuit.

Figure 1:
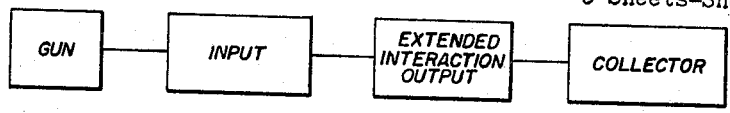

The extended interaction output circuit comprises a plurality of cavity resonators successively arranged along the beam. Each cavity resonator includes an interaction gap for interaction with the electron beam passable therethrough. Inductive coupling means communicate between adjacent cavity resonators to form a composite inductively coupled output cavity resonator structure. In a preferred embodiment, the inductive coupling means, communicating between adjacent cavity resonators, comprises elongated coupling slots communicating through a common wall structure between adjacent resonators with the coupling slots being disposed near the periphery of the coupled cavities. In one embodiment of the present invention, an extended interaction composite cavity resonator is disposed between the input circuit and the output circuit to serve as a buncher cavity for amplifying signal energy on the beam. The spacing between the successive interaction gaps of the composite buncher cavity is preferably greater than the spacing between successive interaction gaps of the output circuit.

---

This invention relates generally to klystrons and more particularly relates to klystrons of the extended interaction type.

The interaction section of a klystron is the portion of the tube that is located between the electron gun and the collector. The basic function of the interaction section, which is composed of an input section for bunching electrons and an output section for extracting R.F. energy from the bunches of electrons that were formed by the input section, is to provide a means for amplifying R.F. energy that is applied to the klystron.

Recently, increasing demands for more powerful microwave tubes have brought about a close scrutiny of all existing types to see what improvements can be made. The classical klystron stands out in attractiveness because, unlike the cross-field devices so far built, it allows most of the electron energy unconverted to R.F. output to be collected at low-power density on a large electrode where there are no R.F. fields, and unlike the traveling-wave tube, there is no instability problem which often necessitates the use of attenuators inside the vacuum to absorb power reflected from a mismatched load or to prevent backward wave oscillations. However, the klystron needed improvement in three respects. Its efficiency is typically 40 percent to 50 percent, its bandwidth is relatively small, and the power dissipated in the output cavity due to circulating R.F. currents is appreciable, and becomes a limiting factor as power output and frequency are raised.

It has been suggested that an axial extension of the interaction region by use of resonant slow-wave structures near synchronism with the beam instead of reentrant cavities would increase not only the bandwidth of the output cavity, but the over-all bandwidth of a klystron amplifier. Such a device was built and tested and indeed did show both improved bandwidth and efficiency. However, the ring-bar structure used in the prior art as the slow-wave resonator is inherently limited structurally in power handling ability.

It is the object of this invention to provide a klystron having increased efficiency, bandwith and power handling ability.

Other objects of this invention will be more apparent from the following description taken in connection with the accompanying drawings.

Figure 2:
Figure 3:
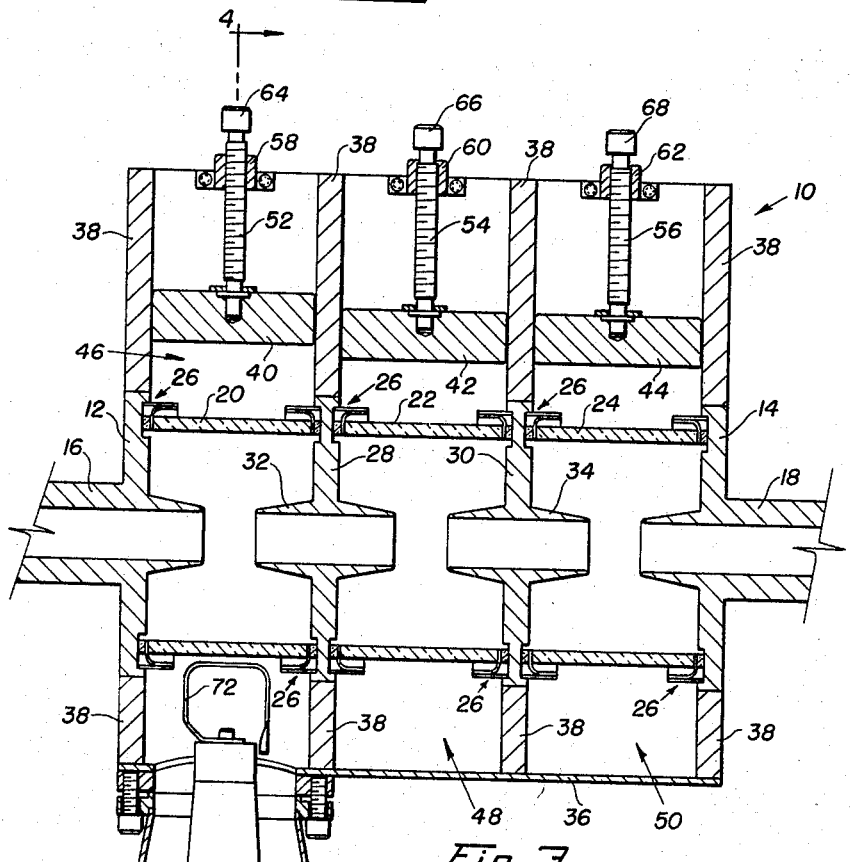
Figure 4:
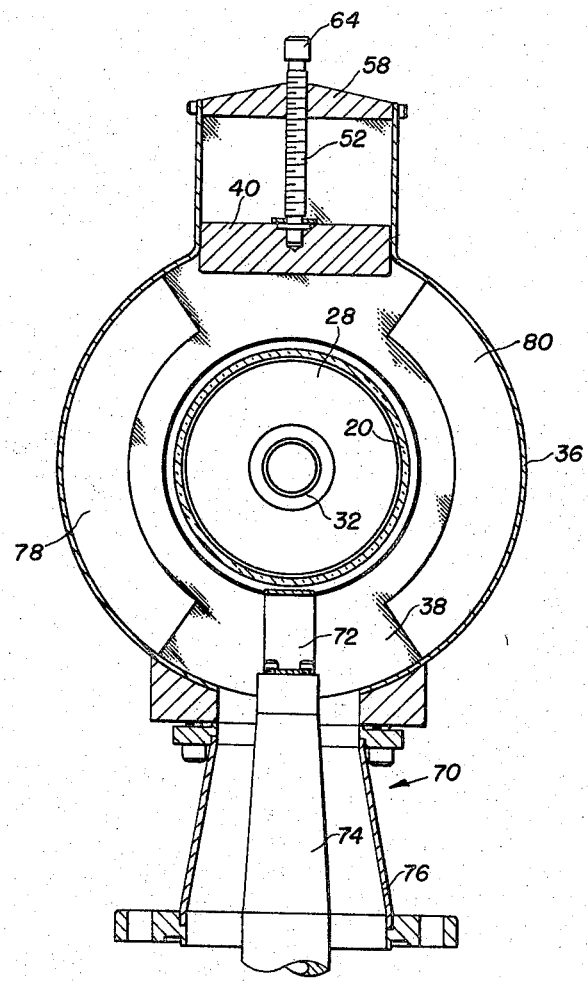
Figures 5, 6:
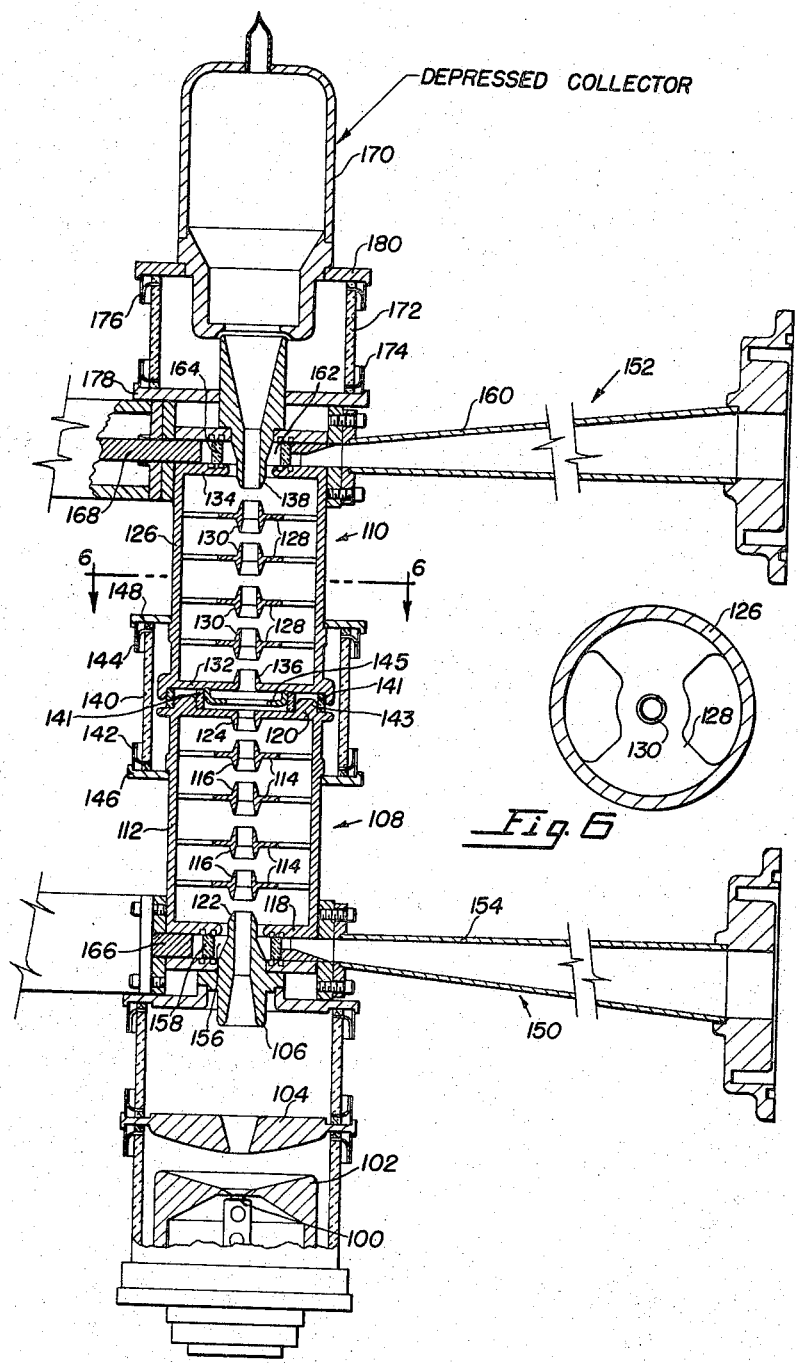

In the drawings:
FIGURE 1 is a diagrammatical view in block form of an extended interaction klystron in accordance with this invention;
FIGURE 2 is a diagrammatical view in block form of another type of extended interaction klystron in accordance with this invention;
FIGURE 3 is a cross-sectional view of an extended interaction cavity structure for use in the extended interaction portions of FIGURES 1 or 2;
FIGURE 4 is a cross-sectional view of FIGURE 3 taken on the line 4—4 thereof;
FIGURE 5 is a cross-sectional view of another embodiment of an extended interaction klystron in accordance with this invention; and
FIGURE 6 is a cross-sectional view of FIGURE 5 taken on the line 6—6 thereof.

Briefly described, this invention relates to a klystron having electron beam forming means for forming a beam of electrons. An interaction section or means including input and output means is provided for bunching portions of the beam of electrons and extracting R.F. energy from the bunched portions of the beam.

The output means of the interaction section is an extended interaction output means which is composed of at least one plural gap, inductively coupled, coupled cavity structure. Similarly, if desired, the input means of the interaction section can be an extended interaction input means composed of at least one plural gap, inductively coupled, coupled cavity structure. The input means can also include a conventional input cavity structure in combination with an attached extended interaction input coupled cavity structure.

Load coupling means for coupling R.F. energy into and out of the interaction section without disturbing the operating mode pattern therein are also a feature of this invention and can be used with or without extended interaction input or output means.

A further aspect of this invention is the combination of an interaction section having extended interaction input and output means with a depressed collector. This combination, in a klystron, provides an efficiency of about 65% which far exceeds conventional klystron efficiencies.

A paper entitled "Experiments With High Power Klystrons Using Extended Interaction Catches" appearing in the May 1963 issue of the IEEE Transactions on Electron Devices and written by the inventors describes some basic concepts of Extended Interaction Cavities.

Referring to FIGURE 1, a block diagram is used to show one embodiment of an extended interaction klystron in accordance with this invention. The klystron utilizes an electron gun, interaction section, and a collector. The interaction section is provided by a conventional input cavity section which can have more than one cavity and an extended interaction output cavity section which can also have more than one cavity.

In FIGURE 2, another form of klystron using the principle of extended interaction is shown in block form. This klystron also uses the basic combination of an electron gun, interaction section, and collector. However, the input portion of the interaction section is composed of a conventional input section in cooperative combination with an extended interaction input cavity section. The output cavity section is an extended interaction output cavity. It should be apparent to those skilled in the art that the second and third boxes of this figure can be interchanged and hence, an extended interaction klystron using this combination could also be advantageous.

FIGURE 3 depicts in cross-section an extended interaction cavity structure that is used in the extended interaction input or output cavity sections of FIGURES 1 or 2. A coupled cavity structure generally designated by the numeral 10 forms the extended interaction cavity of this invention. The coupled cavity structure 10 contains metallic cavity end walls 12 and 14 each of which support drift tubes 16 and 18, respectively. Three cylindrical dielectric windows 20, 22 and 24, preferably of ceramic, are hermetically sealed between the cavity end walls 12 and 14 by means of sandwich type seals generally designated by numeral 26. The seals 26 are located at reduced surface portions in the cavity end walls 12 and 14 and are also located at reduced surface portions in intermediate metal wall members 28 and 30 which also support drift tubes 32 and 34, respectively. In this manner, an external type of cavity structure is provided by the cylindrical windows 20, 22 and 24.

A cylindrical metal member 36 forms the outer wall of the coupled cavity structure 10. The cylindrical metal member 36 is brazed or suitably joined to metal extension members 38 which are brazed to the end wall members 12 and 14 and also to the intermediate metal wall members 28 and 30. The extension members 38 can also be formed as an integral extension member, if desired. Three substantially inductive type tuning plungers 40, 42 and 44 are mounted in coupled cavities 46, 48 and 50, respectively, for the purpose of tuning these cavities to the desired resonant frequency for the particular operating mode of resonance. Each of the tuning plungers 40, 42 and 44 are respectively driven by threaded shafts 52, 54 and 56, each of which is rotatably mounted in suitably threaded nuts 58, 60 and 62, respectively. Manual tuning of each coupled cavity 46, 48 and 50 can be achieved by rotating associated shaft heads 64, 66 and 68, respectively.

An R.F. coupling means of the coaxial type, generally designated by the numeral 70, is adjustably positioned in the first coupled cavity 46 by means not shown. The R.F. coupling means 70 is composed of a copper loop 72 that is connected to a center conductor 74 which is axially mounted within an outer conductor 76 to form a coaxial assembly. The R.F. coupling means 70 is used for inserting or extracting R.F. energy from the coupled cavity structure 10. Although the R.F. coupling means 70 is shown to be inserted into the first coupled cavity 46 of the coupled cavity structure 10, it should be readily apparent to those skilled in the art that the R.F. coupling means 70 can also be inserted into either of the other coupled cavities 48 and 50. However, for stability considerations, the end cavities 46 and 50 may be preferable.

Referring to FIGURE 4, a pair of slots 78 and 80 are shown to be formed in the extension member 38 of the intermediate metal wall member 28. A similar pair of slots are also formed in the extension member 38 of the intermediate metal wall member 30. In this manner, inductive coupling is achieved between the first 46, second 48 and third 50 coupled cavities of the coupled cavity structure 10. In other words, the magnetic field of the mode of resonance in the first coupled cavity 46 is coupled through the slots 78 and 80 of the extension member 38 into the second coupled cavity 48 and the magnetic field of the mode of resonance in the second coupled cavity 48 is coupled into the third cavity 50 by means of the pair of slots in the extension 38 of the intermediate wall member 30.

It should also be apparent to those skilled in the art that coupling loops and other types of coupling devices can be used to inductively couple the cavities 46, 48 and 50 to form the coupled cavity structure 10. While two slot structures are shown in this embodiment, it should be apparent that one, three, four, etc. slots can also be used.

FIGURE 3 depicts an extended interaction cavity structure 10 that is composed of three coupled cavities 46, 48 and 50, and it should be apparent that this invention is also applicable to coupled cavity structures having at least two coupled cavities and as many coupled cavities as is desired.

As is the case in conventional klystron cavities, drift tubes and the other metal parts making up the extended interaction type of cavity structure of this invention are also fabricated of a highly conductive metal, such as copper.

FIGURE 5 depicts another embodiment of this invention wherein an integral cavity type of extended interaction klystron is shown. The integral cavity extended interaction klystron of FIGURE 5 contains a gun portion which includes a cathode 100, a focus electrode 102, a modulating anode 104 and an accelerating anode 106. The interaction section is composed of an input extended interaction coupled cavity structure generally designated by the numeral 108 and an output extended interaction cavity structure generally designated by the numeral 110. The input coupled cavity structure 108 is composed of a cylindrical metal cavity wall 112 to which is connected four circular double-slotted metal members 114. Each of the double-slotted metal members 114 have a drift tube 116 supported therein. End wall portions 118 and 120 are electrically connected to the cylindrical cavity wall 112 and complete the coupled cavity structure 108. The end wall members 118 and 120 support drift tubes 122 and 124, respectively, which are lined up with drift tubes 116 so as to permit the passage therethrough of the electron beam that is emitted from the cathode 100.

The output coupled cavity 110 is formed by means of a cylindrical metal cavity wall 126 to which is joined four circular double-slotted metal members 128. The four double-slotted members 128 each contain a drift tube 130 supported therein. The output coupled cavity 110 is completed by metal end walls 132 and 134 which have drift tubes 136 and 138, respectively.

It has been discovered that better bunching or input bandwidth can be achieved by making the distance between the gap centers of adjacent coupled cavities in the input coupled cavity section 108 larger than the distance between the gap centers of adjacent coupled cavities in the output coupled cavity section 110. This can be done by increasing the distance between the metal members 114 for a given metal thickness. Or in other words, the period or distance between one face on the metal member 114 to the corresponding face on an adjacent metal member 114 is longer than the distance between corresponding faces of adjacent metal members 128.

The input coupled cavity structure 108 is electrically separated by means of a cylindrical ceramic member 140 which is hermetically sealed by means of sandwich seals 142 and 144 to a pair of flanges 146 and 148 which are securely fastened to the cylindrical metal cavity walls 112 and 126, respectively. To prevent R.F. leakage through the ceramic cylinder 140, a pair of ceramic cylinders 141 cooperate with a flange portion 143 which is supported on the end wall 120 and an apertured flange portion 145 which is supported on the end wall 132. It is readily apparent that the input and output coupled cavity structures 108 and 110 can be electrically connected together, if desired.

Referring to FIGURE 6, a cross-sectional view of the output cavity 110 illustrates the double-slot configuration that is formed in the members 128. While the slots are shown to be substantially oval in shape and located at the periphery of the members 128, it should be apparent to those skilled in the art that the slots can be of any desired configuration. Furthermore, the slots in each of the members 128 need not be in line with the slots of the adjacent members 128 to achieve the inductive coupling effect.

R.F. coupling means 150 and 152 are provided for respectively inserting and extracting R.F. energy from the extended interaction input and output sections, respectively. The R.F. input coupling means comprises a waveguide 154 which electrically communicates with an annular region 156 located about the drift tube 122 and in this manner, R.F. energy is coupled through a ceramic window 158 into the annular region 156 and from the annular region 156 axially into the first coupled cavity of the input coupled cavity structure 108.

Similarly the R.F. output coupling means 152 is composed of a waveguide 160 which electrically communicates with an annular region 162 that surrounds the drift tube 138. R.F. output energy is extracted from the output coupled cavity 110 through the last coupled cavity into the annular region 162 and then out through a ceramic window 164 into the output waveguide 160. Shorting plungers 166 and 168 are provided for controlling the amount of R.F. energy that is coupled into and extracted from the input and output coupled cavity structures 108 and 110, respectively, by varying the Q factor of the coupled cavity structures 108 and 110 and not disturbing the mode of resonance in the coupled cavity structures.

A depressed collector 170 is provided to collect the electron beam that has passed through the extended input 108 and output 110 coupled cavity structures. The depressed collector 170 is insulated from the output coupled cavity section 110 by means of a cylindrical ceramic member 172 that is hermetically sealed by means of sandwich type seals 174 and 176 to flanges 178 and 180 which are respectively connected to the output coupled cavity section 110 and the depressed collector 170.

The extended interaction output cavity structure has been necessarily overcoupled to prevent oscillations which results in lowering the Q factor of the coupled cavity structure 10 below the theoretical optimum value. It was not obvious that the depressed collector 170 would increase the efficiency of the klystron of FIGURE 5 to a value of approximately 65%.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In a microwave tube apparatus; means for forming and projecting a beam of electrons over an elongated predetermined beam path; means at the terminal end of the beam path for collecting and dissipating the energy of the beam; means forming an interaction circuit disposed along the beam path for electromagnetic interaction with the beam to produce an output microwave signal; said interaction circuit including, an input circuit portion disposed at the upstream end of said circuit to be excited with microwave signal energy to be amplified to velocity modulate the beam with the signal energy, an output circuit portion disposed downstream of said input circuit portion for excitation by the modulated beam to extract the amplified microwave signal from the beam, the improvement wherein, said output circuit portion comprises a composite coupled cavity resonator structure having a plurality of cavity resonators successively disposed along the beam path, each cavity resonator having an interaction gap for electromagnetic interaction with the beam passable therethrough, inductive coupling means communicating between adjacent ones of said cavity resonators to inductively couple said cavity resonators together to form said composite cavity resonator structure, said composite cavity resonator structure having a resonant mode of oscillation to be excited by the modulated beam for extracting amplified signal energy from the beam and coupling means for extracting a controlled amount of said signal energy from said composite cavity resonator whereby said resonant mode of oscillation is maintained.

2. The apparatus according to claim 1 wherein said composite cavity resonator structure includes a conductive wall member transversely disposed of said beam path and defining a common wall structure between a pair of said coupled cavities, and wherein said common wall structure includes a plurality of elongated coupling slots communicating therethrough and forming said inductive means between adjacent cavity resonators.

3. The apparatus according to claim 1 wherein said composite coupled cavity resonator structure includes at least two conductive wall members transversely mounted with respect to the electron beam in said coupled cavity structure and defining common wall structure between adjacent cavity resonators, each of said common wall structures including an elongated coupling slot therein disposed near the outer periphery of said wall member and forming the inductive coupling means communicating between adjacent coupled cavities, said common wall structures each including a drift tube member coaxially aligned with the beam path for passage of the beam therethrough, said drift tubes having portions which axially extend into said coupled cavities.

4. The apparatus according to claim 1 wherein said input circuit portion includes a plurality of cavity resonators each cavity resonator having an interaction gap for electromagnetic interaction with the beam passable therethrough, and the spacing between adjacent gaps in said input circuit means being greater than the spacing between adjacent gaps of said output composite resonator structure.

5. The apparatus according to claim 1 including means for establishing the operating potential of said collector means at a lower potential than said composite coupled cavity output circuit, whereby the efficiency of the tube is substantially increased.

6. The apparatus of claim 1 including, means for tuning each of said coupled cavities of said composite cavity resonator.

7. The apparatus according to claim 1 wherein a plurality of said coupled cavities include a common wall structure, and wherein said inductive coupling means, communicating between adjacent cavities, comprises an inductive coupling slot communicating through said common wall structure.

8. The apparatus according to claim 7 wherein said common wall structure includes a drift tube coaxially aligned with the beam and axially projecting from said common wall into adjacent cavity resonators.

9. The apparatus according to claim 1 wherein said input circuit portion includes a composite coupled cavity resonator structure having a plurality of cavity resonators successively disposed along the beam path, each of said cavity resonators of said input circuit having an interaction gap for electromagnetic interaction with the beam passable therethrough, inductive coupling means communicating between adjacent cavity resonators of said input circuit to form said composite input cavity resonator, and said composite input cavity resonator having a resonant mode to be excited by the input signal for velocity modulating the beam.

10. The apparatus according to claim 9 wherein said inductive coupling means communicating between adjacent input coupled cavity resonators comprises an inductive coupling slot communicating through a wall structure between adjacent cavity resonators.

References Cited
UNITED STATES PATENTS

| 2,444,066 | 6/1948 | Rostas | 315—5.46 |
| 2,958,804 | 11/1960 | Badger et al. | 315—5.39 |
| 2,967,968 | 1/1961 | Nalos | 315—5.39 |
| 3,097,324 | 7/1963 | Salisbury | 315—5.39 |
| 3,278,795 | 10/1966 | Mihran | 315—5.39 |

HERMAN KARL SAALBACH, *Primary Examiner.*

P. L. GENSLER, *Assistant Examiner.*